March 6, 1962 F. E. HARWOOD ET AL 3,024,077

TIME RECORDING SYSTEM AND APPARATUS

Filed July 25, 1957 4 Sheets-Sheet 1

INVENTORS
FLOYD E. HARWOOD
JOHN T. PARSONS
BY
Mason, Kolehmainen, Rathburn and Wyss
ATTORNEYS March 6, 1962 F. E. HARWOOD ET AL 3,024,077

TIME RECORDING SYSTEM AND APPARATUS

Filed July 25, 1957 4 Sheets-Sheet 2

March 6, 1962 F. E. HARWOOD ET AL 3,024,077

TIME RECORDING SYSTEM AND APPARATUS

Filed July 25, 1957 4 Sheets-Sheet 3

3,024,077
Patented Mar. 6, 1962

3,024,077

TIME RECORDING SYSTEM AND APPARATUS

Floyd E. Harwood, Ypsilanti, and John T. Parsons, Traverse City, Mich., assignors to Parsons Corporation, Traverse City, Mich., a corporation of Michigan Filed July 25, 1957, Ser. No. 674,124
9 Claims. (Cl. 346—22)

This invention relates to a data handling system and, more particularly, to a key controlled time recorder unit for automatically recording both instant time and an employee's designation on a record medium.

The copending application of John T. Parsons and Floyd E. Harwood, Serial No. 674,131, filed July 25, 1957, which application is assigned to the same assignee as the present application, discloses a data handling system in which the identification of an entity, such as an employee, is automatically recorded in conjunction with instant date and time by a recorder unit. The operation of this recorder unit is initiated by the insertion of an indicia bearing key into a sensing device, which detects the indicia to provide the employee identification, and by the manual insertion of a card for receiving the time and identification record into the recorder unit. One use to which the recorder unit shown in the above identified application may be applied is to provide these units at the gates of a factory or the entrances to the various departments in a factory so that, by the manual insertion of the key and a blank card, a permanent record of the employee's time in and time out is provided in the form of a punched card. However, in plants where large numbers of employees pass through a time aisle during a relatively short period of time, the time required to manually insert both a record card and a key may produce undesirable delays.

Accordingly, one object of the present invention is to provide a new and improved key controlled time recorder capable of relatively high speed operation.

Another object is to provide a key controlled time recorder including an automatic card feeding magazine.

A still further object is to provide a time recorder unit including new and improved means for feeding a card into the recorder unit.

Another object is to provide a time recorder unit having control circuit means for synchronizing the operation of the recorder with the operation of a magazine for feeding record blanks into the recorder.

In accordance with these and many other objects, an embodiment of the present invention comprises a time recorder unit including a punching mechanism and a card transport mechanism for feeding a card to a punching position, for advancing the card step-by-step during operation of the punching mechanism, and for rejecting a punched card from the recorder incident to the completion of the punching operation. The time recorder unit includes a continuously operative timing circuit including a plurality of serially connected stepping switches for providing marking conditions representing instant date and time, and further includes a group of register relays which are selectively operated by the insertion of a coded key into a sensing device therefor to provide marking conditions representing the digits forming the badge number or other identification of an employee. When the key is inserted into the sensing device, the indicia on the key is sensed and stored in the register relays and a cycle of operation of the punching apparatus under the control of a commutator is initiated during which the timing circuit and the register relays provide instant date and time information and employee designation information to the punching apparatus for recording on the record card.

At the completion of this recording operation, the punched card is ejected and the control circuit included in the time recorder unit operates a card feeding mechanism so that a single card from a card magazine containing a plurality of such cards is fed into a guideway through which the card is to be advanced to the punching apparatus. In response to the insertion of a record card into the guideway, the control circuit renders a second card feeding or driving mechanism effective to advance the card to a punching position, as determined by a card locating or stop assembly. When the card moves into the punching position, the control circuit renders the second drive means ineffective. Accordingly, by the insertion of a key into the time recorder unit, a card is punched with date, time, and employee designation information, the punched card is ejected from the time recorder unit, and a blank card is fed from a card magazine into a punching position within the time recorder unit.

Many other objects and advantages of the present invention will become apparent from a consideration of the following detailed description when read in conjunction with the following drawings wherein:

FIGS. 4 and 5 are schematic circuit diagrams of a control circuit embodied in the time recorder unit of the present invention; and FIG. 6 is a block diagram illustrating the manner in which FIGS. 4 and 5 are disposed adjacent each other to form a complete circuit diagram.

Figures 1, 2B, 3:
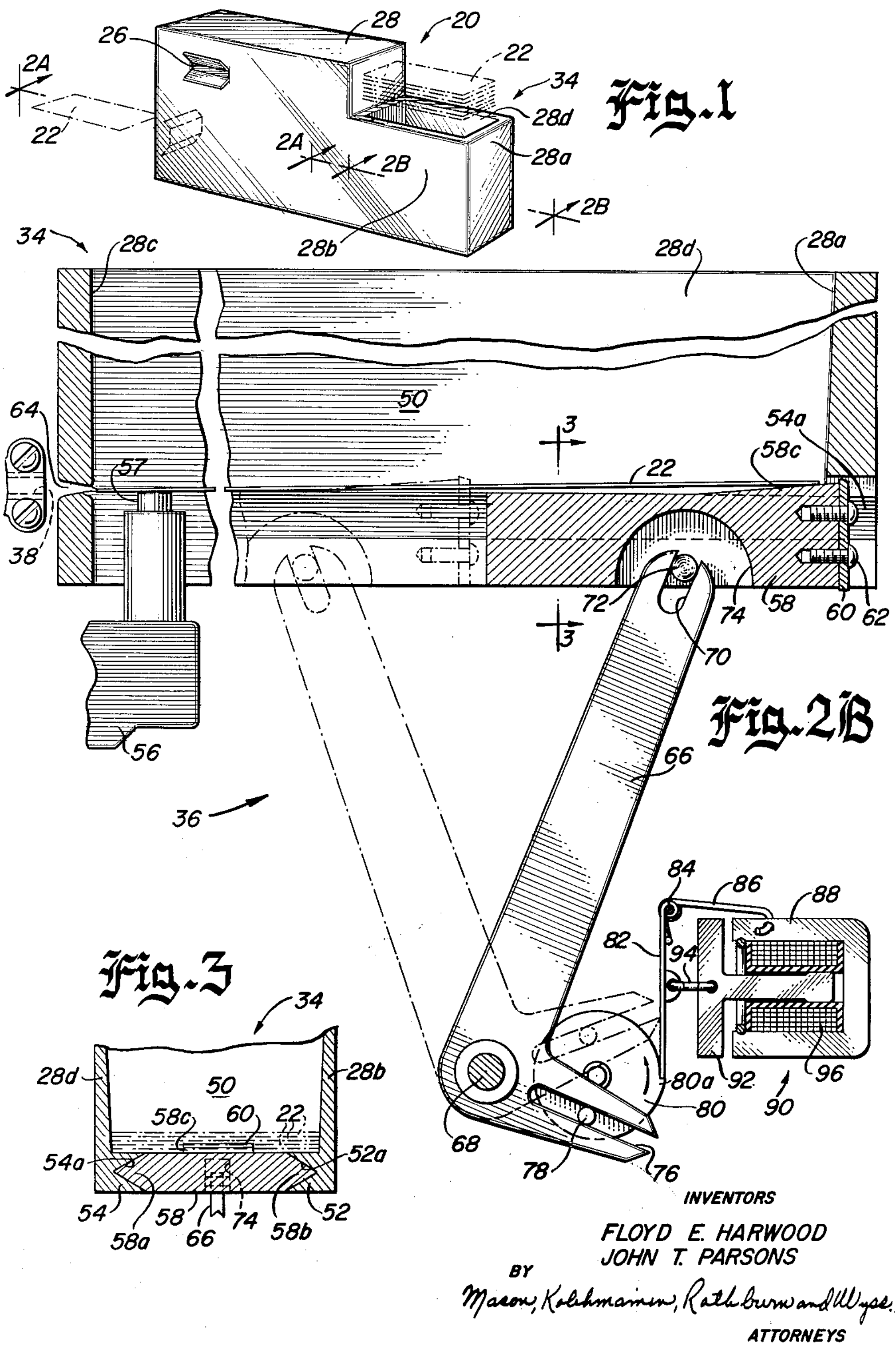
FIG. 1 is a perspective view of an automatic key controlled time recorder unit which embodies the present invention.
FIG. 2B is a sectional view taken along line 2B—2B in FIG. 1 illustrating the details of a card magazine including card feeding means.
FIG. 3 is a sectional view, on a reduced scale, taken along line 3—3 in FIG. 2B, assuming that the entire magazine construction is disclosed therein.

Referring now to FIG. 1 of the drawings, therein is shown a key controlled and automatically operated time recorder unit 20 which embodies the present invention and which automatically provides a punched card 22 including instant date and time and the designation of an employee in response to the manual insertion of a coded key into a key sensing device in the recorder unit 20. The construction and operation of much of the unit 20 is substantially identical to the recorder unit described and disclosed in detail in the above identified copending Parsons and Harwood application, except as modified by the disclosures in the present application.

Figure 4:
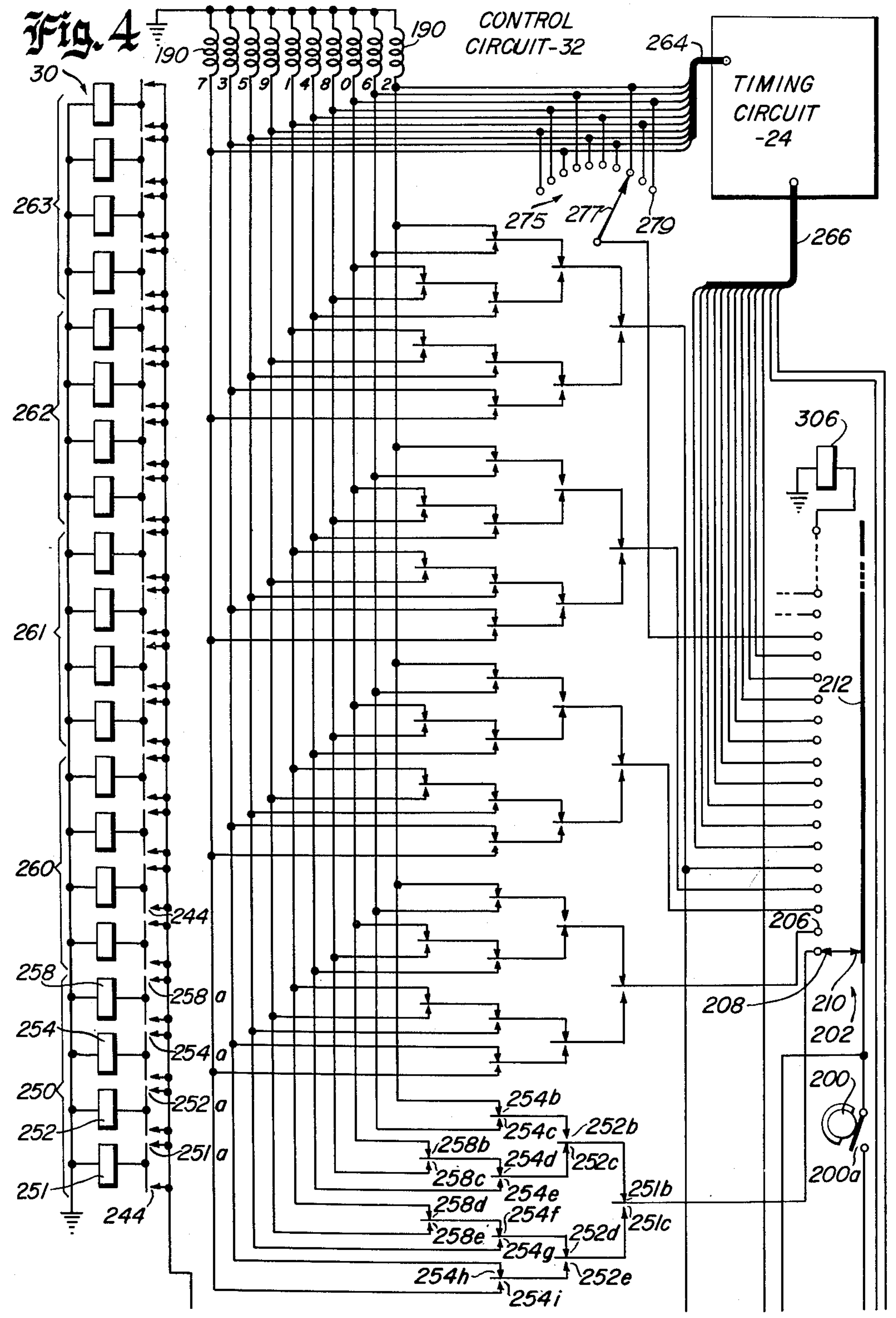
Figures 5, 6:
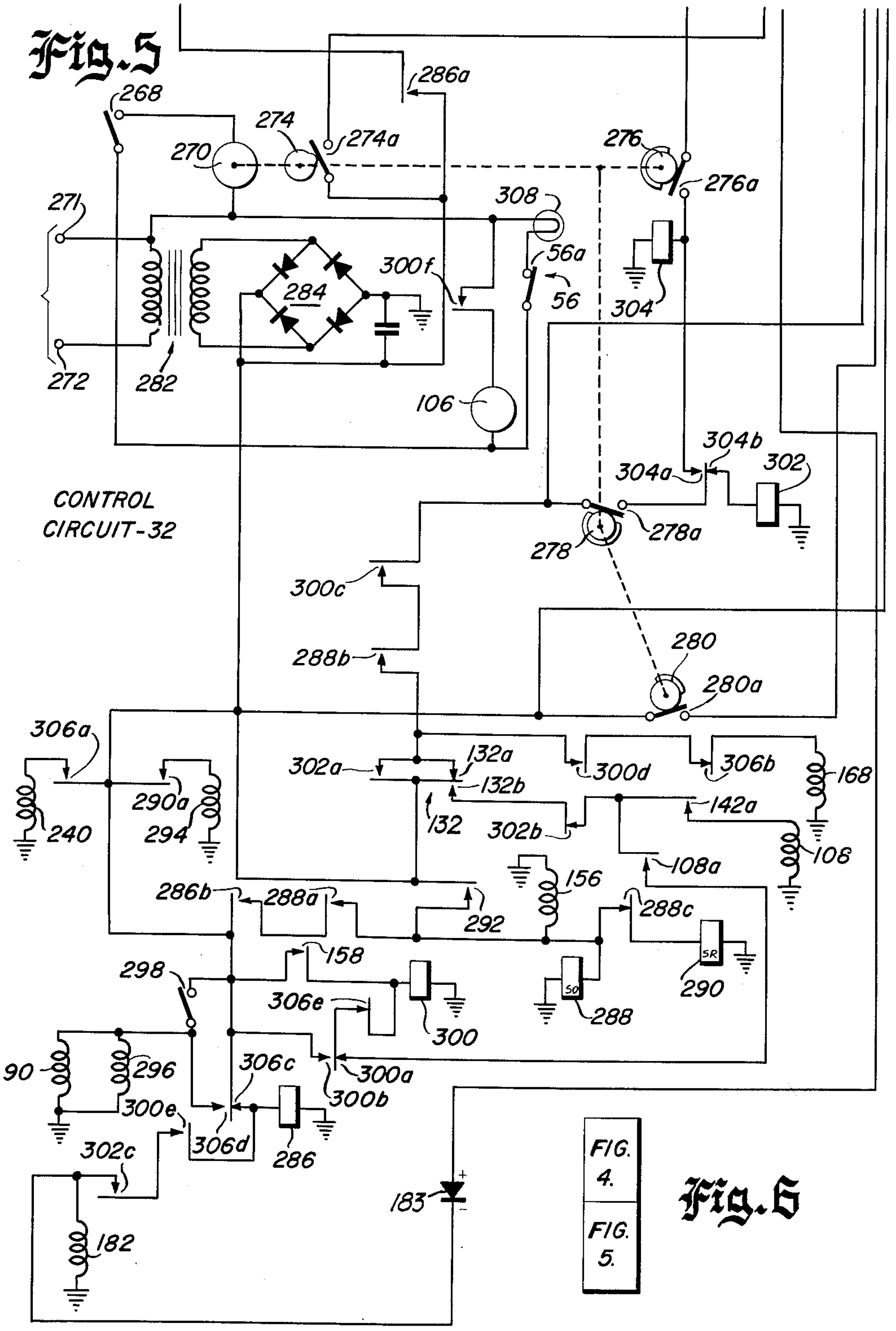

To provide information representing instant date and time, the unit 20 includes a timing circuit 24 (FIG. 4) which comprises a plurality of serially connected stepping switches continuously operative under the control of a timing motor to settings representing instant date and time. The time recorder unit 20 is provided with information relating to the badge number or identification of an employee by a sensing unit (not shown) which is identical to the sensing unit disclosed and described in the above identified Parsons et al. application and into which a key having indicia, such as perforations, is inserted through an opening 26 in a housing 28 for the unit 20. The insertion of the coded key into the sensing unit through the opening 26 selectively operates a register relay circuit 30 (FIG. 4) to store the designation of the employee so that the recorder unit 20 is provided with stored information representing the instant date and time and identification of an employee, thereby permitting this information to be recorded on a blank record card 22 under the control of a control circuit 32 (FIGS. 4 and 5).

Figure 2A:
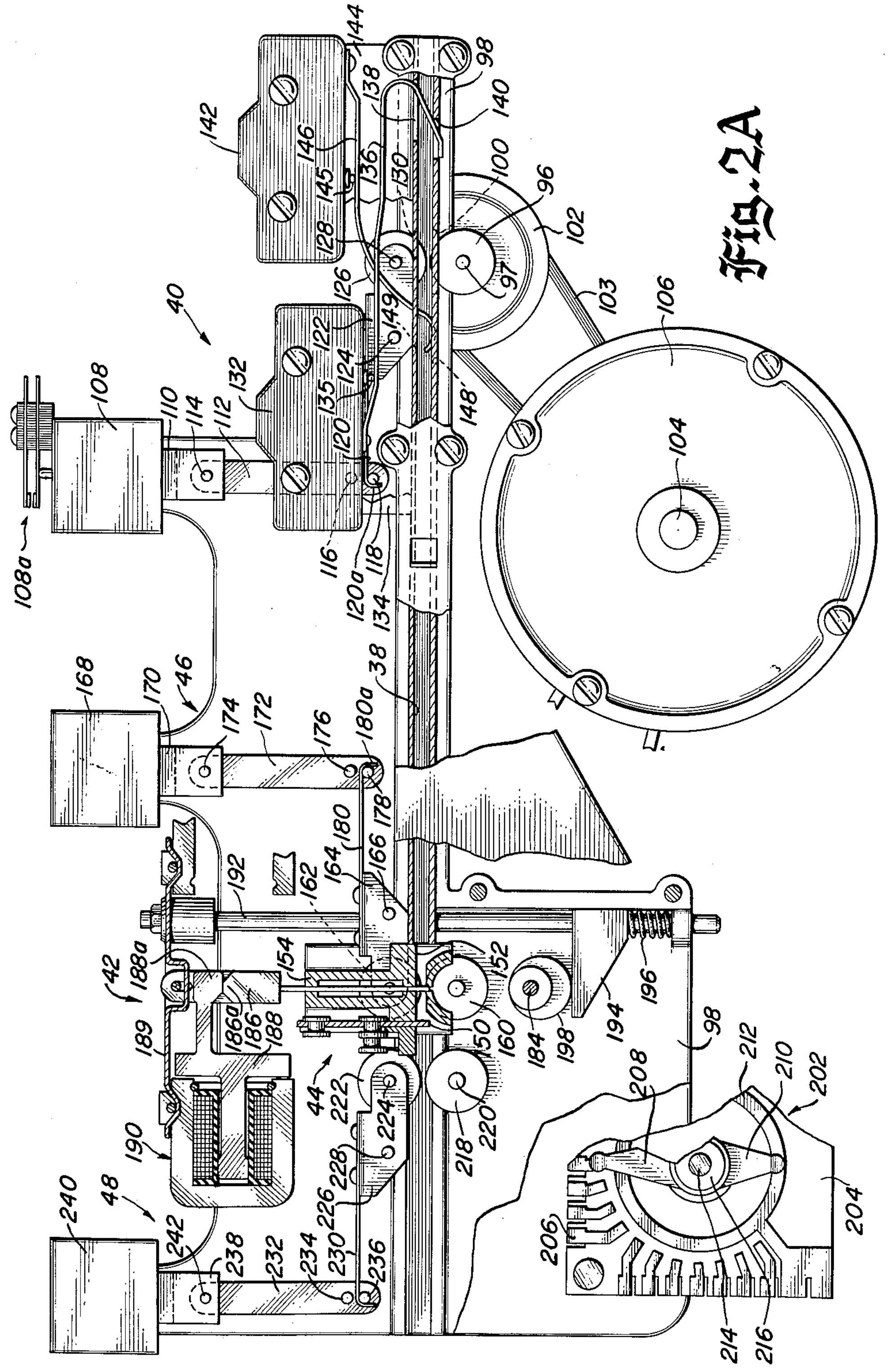
FIG. 2A is a sectional view taken along line 2A—2A in FIG. 1 illustrating the general arrangement of a punching apparatus of the type disclosed in detail in the above identified copending Parsons and Harwood application.

To automatically supply blank cards 22 for receiving the time and identification information, the time recorder unit 20 includes a card magazine 34 (FIGS. 1, 2B, and 3) which is adapted to receive a plurality of record cards 22. A first card feeding mechanism 36 (FIG. 2B), which is operated under the control of the circuit 32 incident to each cycle of recording operation of the unit 20, feeds a single card from the magazine 34 into a guideway 38 (FIG. 2A). The insertion of a card into the guideway 38 from the magazine 34 renders a second card feeding assembly, indicated generally as 40 effective to advance the card to a punching assembly 42 in a position determined by a card locating or stop assembly 44 in which it is capable of receiving the items of information to be recorded. Following the movement of the card 22 to the position determined by the locating assembly 44, the second card feeding assembly 40 is rendered ineffective.

When a key is inserted into the sensing device, a card indexing drive assembly, indicated generally as 46, is rendered effective to advance the card step-by-step in synchronism with the selective operation of the punching assembly 42, and the locating assembly 44 is operated or displaced to permit this step-by-step movement of the card 22 under the control of the indexing drive assembly 46. At the completion of the recording operation, the indexing drive assembly 46 is rendered ineffective and an ejecting drive assembly 48 is placed in operation to eject the punched card 22 from the recorder unit 20 into a suitable receptacle therefor. Incident to the completion of the ejection operation, the card locating assembly 44 is restored to its card intercepting position by the control circuit 32. Further, at the completion of the recording of the information on the card 22, the control circuit 32 actuates the first and second card feeding assemblies 36 and 40 so that a blank record card 22 is advanced from the magazine 34 and through the guideway 38 to the punching position determined by the released card locating assembly 44. The card 22 remains in this position until a key is next inserted through the opening 26 into the sensing unit.

Referring now more specifically to the magazine 34 (FIGS. 1, 2B, and 3), this magazine is defined by four vertically extending and rectangularly arranged walls 28*a–d* of the housing 28 to provide a cavity 50 in which a plurality of vertically stacked cards 22 are disposed. Preferably, a card weight is then placed on the uppermost of the cards 22 to force them downwardly to rest on a pair of inwardly turned edges or flanges 52 and 54 formed integral with the walls 28*b* and 28*d*. In order to indicate the presence of a supply of cards 22 in the magazine 34, a switch 56 is provided having an operating stem 57 which extends upwardly into the cavity 50 to be engaged and depressed by the lowermost card 22. Accordingly, when the switch 56 is actuated, the control circuit 32 is provided with information indicating the presence of the cards in the magazine 34. Alternatively, when the switch 56 is in a released condition, the circuit 32 is provided with information indicating the absence of the cards 22.

The first card feeding means 36 (FIGS. 2B and 3), which feeds an individual blank record card 22 from the magazine 34 into the guideway 38, includes a knife supporting block 58 having a pair of tapered and longitudinally extending edges 58*a* and 58*b* which are slidably received within V-shaped depressions 54*a* and 52*a* formed in the flanges 52 and 54, respectively. A card knife 60 secured to the back edge of the block 58 adjacent an inclined portion 58*c* thereon by a plurality of fasteners 62 is adapted to engage the trailing edge of only the lowermost card 22 in the stack of cards provided within the cavity 50 so that, when the block 58 is moved to the left (FIG. 2B), the lowermost card 22 is withdrawn from the stack and moved outwardly through an opening 64 into the guideway 38.

To provide means for reciprocating the knife supporting block 58, a bell crank 66 pivotally mounted on a shaft 68 is provided. One arm of the bell crank 66 is provided with a slot 70 in which is slidably received a pin 72 carried within a semicircular recess 74 formed in a lower portion of the knife supporting block 58. The other arm of the bell crank 66 is provided with a slot 76 in which is slidably mounted a pin 78 carried on a detent element 80. The detent element 80 is connected to a suitable prime mover through a slip clutch which tends to rotate this element in a counterclockwise direction, as viewed in FIG. 2B. This counterclockwise rotation of the element 80 is normally restrained by a latching arm 82, one end of which is pivotally mounted on a pin 84 and the other end of which bears against a shoulder 80*a* formed in the outer periphery of the element 80. The latching arm 82 is biased into engagement with the element 80 by a spring 86, one end of which passes around the pivot pin 84 to bear against the latching arm 82 and the other end of which is secured to any suitably fixed supporting structure, such as a field structure 88 for a solenoid 90.

To provide control means for rendering the first card feeding mechanism 36 effective to advance a card 22 from the magazine 34 into the guideway 38, there is provided the solenoid 90 which is selectively operated by the control circuit 32. The solenoid 90 preferably is of the construction disclosed and described in detail in the copending application of Floyd E. Harwood, Serial No. 660,201, filed May 20, 1957, now Patent No. 2,904,729 which application is assigned to the same assignee as the present application. The solenoid 90, which is suitably mounted on the housing 28 of the time recorder unit 20, includes a somewhat T-shaped armature 92 to which the latching arm 82 is pivotally connected by a link 94. When the first card feeding assembly 36 is to be rendered effective, a winding 96 (FIGS. 2B and 5) of the solenoid 90 is energized by the control circuit 32 to move the armature 92 to the right, as viewed in FIG. 2B, thereby displacing the latching arm 82 against the action of the spring 86 and out of engagement with the shoulder 80*a*. This permits the element 80 to rotate in a counterclockwise direction during which the pin 78 displaces the bell crank 66 first in a counterclockwise direction and then in a clockwise direction to reciprocate the knife supporting block 58. During this counterclockwise deflection, the knife 60 engages the lowermost card 22 in the magazine 34 and advances it through the opening 64 and into the guideway 38. Further, during the rotation of the detent element 80, the solenoid 90 is released so that the spring 86 biases the latching arm 82 into engagement with the outer periphery of the element 80. Accordingly, following the completion of one cycle of revolution, the free end of the latching arm 82 again engages the detent shoulder 80*a* to arrest further movement of the element 80 under the control of the slip clutch.

The second card feeding assembly 40 (FIG. 2A) advances the card 22 fed into the guideway 38 by the first card feeding assembly 36 to the punching position adjacent the assembly 42 determined by the card locating assembly 44. The feeding assembly 40 includes a wheel 96 which is secured to a shaft 97 rotatably mounted on a frame structure 98 and which extends upwardly into the guideway 38 through an opening 100 in the frame 98. The other end of the shaft 97 is secured to a pulley 102 which is drivingly connected by a belt 103 to a similar aligned pulley (not shown) on a shaft 104 of a drive motor 106 so that, following energization of the motor 106, the drive wheel 96 is in continuous rotation.

In order to provide means for selectively rendering the drive wheel 96 in the second card feeding assembly 40 effective to advance a card 22 fed into the guideway 38, a solenoid 108 (FIGS. 2A and 5) is provided having an armature 110 to the bifurcated end of which is pivotally secured a link 112 by a pivot pin 114. The lower end of the link 112 is provided with a pair of vertically spaced pins 116 and 118 between which is disposed an offset end portion 120*a* of a flat spring 120. The other end of the spring 120 is secured to the bight portion of a U-shaped bracket 122 which is pivotally mounted on the frame 98 by a pivot pin 124. An idler roller 126 is rotatably mounted between the legs of the U-shaped bracket 122 by a shaft 128 and extends into the guideway 38 through an opening 130 in the frame 98. Accordingly, when the solenoid 108 is energized to retract the armature 110, the idler roller or wheel 126 is moved toward the wheel 96 to resiliently bias the card 22 in the guideway 38 into engagement with the wheel 96, thereby rendering this wheel effective to advance the card. The operation of the solenoid 108 also closes a pair of contacts 108*a* (FIGS. 2A and 5).

To provide means for indicating to the control circuit 32 that a card 22 has been inserted into the guideway 38 by the first card feeding assembly 36, a switch 132 (FIGS. 2A and 5) is provided which is mounted on the frame 98 by a bracket 134. An operating element 135 for the switch 132 is adapted to be actuated by a flexible arm 136, one end of which is secured to the switch 132 and the other end of which extends downwardly through the guideway 38 through a pair of openings 138 and 140 in the frame 98. When a card 22 is advanced into the guideway 38, the free end of the resilient arm 136 is engaged and deflected so that the operating element 135 of the switch is actuated to operate the switch 132. When the card 22 is advanced to the position determined by the stop assembly 44, the trailing edge of the card 22 moves out of engagement with the free end of the arm 136, thereby releasing the switch 132.

To provide information to the control circuit 32 indicating that the leading edge of the card 22 supplied from the magazine 34 has moved beyond the aligned drive wheel 96 and idler roller 126 so that the idler 126 can be biased toward the wheel 96 with the card 22 interposed therebetween, a second switch 142 (FIGS. 2A and 5) is provided which is suitably mounted on the frame 98 by a bracket 144. An operating element 145 of the switch 142 is engaged by a flexible operator arm 146, one end of which is secured to the switch 142 and the other end of which extends downwardly into the guideway 38 through a pair of openings 148 and 149 in the frame 98. Therefore, when the leading edge of the card 22 moves beyond the drive wheel 96, the free end of the resilient arm 146 is engaged and deflected so that the switch 142 is operated. This switch, however, remains operated following the movement of the card 22 to the position determined by the card locating assembly 44 and is not released until such time as this card has further been advanced under the control of the indexing drive assembly 46.

Referring now to the gate assembly 44 (FIG. 2A), this assembly is identical to the similar assembly described and disclosed in detail in the above identified copending Parsons et al. application and, in general, includes a shiftable stop or gate element 150 which normally extends across a card receiving passageway 152 formed in a punch guiding frame 154. When a solenoid 156 (FIG. 5) is actuated, the gate element 150 is elevated so that it no longer extends across the passageway or opening 152, thereby permitting the card 22 to be advanced by the indexing drive assembly 46. The upward movement of the gate assembly 150 also operates a switch to close a pair of contacts 158 (FIG. 5). When the solenoid 156 is released at the completion of a recording operation, the gate 150 moves downwardly to engage the upper surface of the punched card and does not move down fully to open the contacts 158 until such time as the punched card 22 has been ejected by the ejecting drive assembly 48.

The card indexing drive assembly 46 (FIG. 2A) is rendered effective by the control circuit 32 in response to the insertion of a key into the sensing device and operates to advance the card 22 in the punching position step-by-step in synchronism with the operation of the punching assembly 42. The assembly 46 includes a drive wheel 160 which is rotatably mounted on the frame 98 and which is driven through short increments of angular movement by a drive assembly including a Geneva movement. To selectively render the indexing drive wheel 160 effective to advance the card 22, the assembly 46 includes an idler roller 162 which extends into the card receiving opening 152 in alignment with the drive wheel 160 and which is rotatably mounted on a U-shaped bracket 164. The bracket 164 is pivotally mounted on the frame 98 by a pivot pin 166. To selectively shift the idler roller 162 toward the drive wheel 160, a solenoid 168 (FIGS. 2A and 5) is provided having a bifurcated armature 170 to which a link 172 is connected by a pivot pin 174. The lower end of the link 172 includes a pair of vertically spaced pins 176 and 178, the latter of which supports an offset end portion 180*a* of a flat spring 180, the other end of which is secured to the bight portion of the supporting bracket 164.

When the solenoid 168 is operated by the control circuit 32 to retract its armature 170, the bracket 164 is pivoted in a counterclockwise direction to move the idler roller 162 toward the drive wheel 160 with the card 22 to be punched interposed therebetween. The spring 180 thus resiliently biases the idler roller 162 against the interposed card 22 so that it, in turn, is biased into engagement with the drive wheel 160. When the solenoid 168 is released, the armature 170 is restored to the position illustrated in FIG. 2A by biasing means (not shown) so that the idler roller 162 is moved out of engagement with the card 22.

The wheel 160 is moved through successive short increments of angular movement under the control of a Geneva movement which is driven by the motor 106 through a friction type slip clutch, as illustrated in detail in the above identified copending Parsons et al. application. When the step-by-step movement is to be initiated, a clutch solenoid 182 (FIG. 5) is operated to release a detent mechanism so that a control shaft 184 (FIG. 2A) is placed in rotation. During each cycle of rotation of the main control shaft 184, the Geneva mechanism advances the indexing drive wheel 160 through a short increment of angular movement, thereby to advance the card 22 a single step through the card receiving opening 152 in the punch guiding frame 154.

The punching assembly 42, which is identical to that disclosed in the copending Parsons et al. application, is operated in synchronism with the step-by-step movement of the card 22 through the card receiving opening 152 to selectively perforate date, time, and employee designation information on the card 22. The punching assembly 42 generally comprises ten punch elements 186 which extend transversely across the path of movement of the card 22 through the opening 152 and which are slidably mounted on a punch supporting frame 189. Each of the punching elements 186 includes a shouldered portion 186*a* adjacent to which is disposed an armature 188 of one of ten interposer solenoid constructions 190 (FIGS. 2A and 4). The solenoids 190 are mounted on the frame 189 in a staggered relationship with alternate ones of the solenoids disposed on opposite sides of the transversely extending line of punch elements 186. When one of the interposer solenoids 190 which preferably are of the type disclosed in the above identified copending Harwood application, is operated to the position illustrated in FIG. 2A, an enlarged portion 188*a* of the armature 188 thereof is moved into an interposed position between the shouldered portion 186*a* of the related punch element 186 and a lower surface of the punch supporting frame 189, thereby to selectively block movement of this punch element relative to the frame 189.

To operate the punching assembly 42, the punch supporting frame 189 is slidably mounted on the frame 98 by a pair of pull rods 192. The lower ends of the pull rods 192 are each provided with a cam follower element 194 between which a flange on the frame 98 is disposed a compression spring 196. The compression springs 196 bias the cam follower elements 194 into engagement with the outer peripheries of a pair of pull down cams 198 which are secured to the main control shaft 184. Accordingly, during each cycle of rotation of the control shaft, the rods 192 are moved downwardly so that the punch elements 186 move downwardly into the card receiving opening 152. Those of the punch elements 186 which are not blocked by operation of the associated interposer solenoids 190 bear against the upper surface of the card 22 and move relative to the punch supporting frame 189. However, the punch elements 186 which are associated with operated interposer solenoids 190 are blocked against movement relative to the frame 189, and thus perforate the card 22 in accordance with the selective operation of the solenoids 190. Incident to each cycle of rotation of the control shaft 184, the compression springs 196 restore the punch supporting frame 189 to its uppermost position.

To provide the control circuit 32 with an operating pulse preceding each operation of the punching assembly 42, the main control shaft 184 also carries a control cam 200 (FIG. 4) which momentarily closes a pair of contacts 200*a* incident to each cycle of rotation of the main control shaft 184. Further, in order to synchronize the operation of the punch assembly 42 with the transmission of successive different items of information to the ten interposer solenoids 190, the recorder unit 20 includes a commutator indicated generally as 202 in FIGS. 2A and 4. The commutator 202 includes a dielectric plate 204 on which a plurality of individual conductive segments 206 are provided. The individual conductive segments 206 are adapted to be sequentially engaged by a wiper 208 which is electrically connected to and preferably formed integral with a second wiper 210 which engages a common commutator ring 212. The wipers 208 and 210 are connected to a shaft 214 by a dielectric bushing 216, and the shaft 214 is driven through a gear train actuated by the main control shaft 184 so that the shaft 214 is advanced a short increment of angular movement sufficient to move the wiper 208 out of engagement with one of the conductive segments 206 and into engagement with the next adjacent conductive segment 206 in response to each cycle of rotation of the main control shaft 184. Thus, the step-by-step operation of the card indexing drive assembly 46, the operation of the punch assembly 42, and the step-by-step movement of the commutator 202 are synchronized by the common control shaft 184.

The ejecting drive assembly 48 (FIG. 2A) is rendered effective by the the control circuit 32 following the completion of a cycle of recording operation so as to eject the punched card 22 from the recorder unit 20. The assembly 48 includes a continuously driven wheel 218 secured to a shaft 220 which is rotatably mounted on the frame 98 immediately adjacent the card receiving opening 152 in the punch guiding frame 154. To render the wheel 218 effective to eject the punched card 22, an idler roller 222 is provided which is rotatably mounted on a substantially U-shaped bracket 226 by a shaft 224. The bracket 226 is pivotally mounted on the frame 98 by a pivot pin 228, and the bight portion of the bracket 226 is connected by means of a flat spring 230 to a link 232, an offset free end of the spring 230 being received between a pair of pins 234 and 236 carried on the lower end of the link 232. The other end of the link 232 is pivotally connected to the bifurcated end of an armature 238 of a solenoid 240 (FIGS. 2A and 4) by a pivot pin 242. Accordingly, when the solenoid 240 is energized by the control circuit 32 to retract the armature 238, the link 232 is moved upwardly so that the bracket 236 pivots in a clockwise direction to place the idler roller 222 in engagement with the card 22 to be ejected and to bias this card against the continuously rotating wheel 218. This results in the immediate ejection of the punched card 22. Upon completion of the ejection of the punched card 22, the control circuit 32 releases the solenoid 240 so that biasing means (not shown) restore the armature 238 to its normal position and thus move the idler roller 222 out of its shifted position adjacent the drive wheel 218.

Referring now to the control circuit 32 (FIGS. 4 and 5), the register relay circuit 30 includes five groups of register relays 250, 260, 261, 262 and 263 which are operated by the sensing device to store the coded digits forming the designation or identification of the employee. The mechanical construction of the key or check sensing device is shown in the above identified Parsons et al. application. Each of these relay groups includes four register relays, such as a plurality of relays 251, 252, 254 and 258 in the relay group 250 which store the coded representation of the first of the five digits forming the designation of identification of the employee. When a badge is inserted into the sensing unit, a plurality of contacts 244 in this unit are selectively closed so that the group of relays forming the binary coded representation of the value of the decimal digit are operated. For instance, assuming that the first digit of the designation of the employee's badge number is "8," only the relay 258 in the relay group 250 is operated to close a plurality of contacts 258*a*, 258*c* and 258*e* and to open a plurality of contacts 258*b* and 259*d*. The closure of the contacts 258*a* completes a holding circuit for the relay 258 to maintain this relay operated when the associated pair of contacts 244 are opened in response to the release of the sensing device.

The remaining contact operations produced by the actuation of the relay 258 establish a single marking path through a conventional decoding relay "tree" controlled by the relays in the group 250 representing the value of the first decimal digit in the designation of the employee. More specifically, since the value of this first digit is assumed to be "8," a marking path is prepared extending through a plurality of closed contacts 251*b*, 252*c* and 254*d*, controlled by the relays 251, 252 and 254, to the contacts 258*c* which were closed by the operation of the relay 258. This path then extends to the interposer solenoid 190 representing the digit "8," as indicated by the character appearing immediately adjacent the winding of this solenoid in FIG. 4 of the drawings. In a similar manner, the selective operation of the relay groups 260—263 causes the storage of the binary representations of the remaining four digits of the designation, and the selective operation of the relays in these groups provides four separate marking paths representing the values of the remaining digits of the designation.

In order to provide information relating to instant date and time, the control circuit 32 includes the timing circuit 24 which is identical to the timing circuit disclosed and described in detail in the above identified Parsons et al. application. The plurality of automatically operated stepping switches and manual switches provided therein provide marking conditions representing six digits of the date and the time and four digits forming the designation of the month and the year. The six digits provided by the stepping switches comprise tens and units days, tens and units hours, and tenths and hundredths of an hour. To selectively supply information to the ten interposer solenoids 190 representing the settings of the timing switches in the circuit 24, the contact banks thereof are connected in multiple and to the windings of these solenoids 190 over a cable 264. The wipers associated with these various contact banks are sequentially provided with an energizing signal over the conductors forming a cable 266 by the commutator 202.

The operation of the stepping switches in the timing circuit 24 to the positions indicative of instant date and time is initiated by the closure of a switch 268 (FIG. 5) which connects the winding of a timing motor 270 across a voltage source connected to a pair of terminals 271 and 272. The shaft of the motor 270 is connected to four control cams 274, 276, 278 and 280 which selectively open and close a plurality of contacts 274*a*, 276*a*, 278*a* and 280*a* associated therewith. The speed of rotation of the motor 270 is such that the contacts 274*a* are momentarily closed at intervals of thirty-six seconds, thereby providing time spaced pulses for operating the timing circuit 24 from a voltage source comprising an input transformer 282 connected across the terminals 271 and 272 and a full wave rectifier bridge 284. The contacts 280*a* controlled by the cam 280 cooperate with the contacts 274*a* in controlling the step-by-step operation of the timing circuit 24.

To provide information representing the gate at which or the department in which the time recorder unit 20 is located, the control circuit 32 includes a manually adjustable switch 275 having a wiper 277 which is adjusted relative to a bank of contacts 279. Assuming that the time recorder 20 is located at the gate arbitrarily indicated as "2," the wiper 277 is adjusted to the position indicated in FIG. 4 in which it engages a contact 279 which is connected to the interposer solenoid 190 representing the numerical character "2."

Referring now more specifically to a cycle of operation of the time recorder unit 20 under the control of the control circuit 32 (FIGS. 4 and 5), in the normal condition of the circuit a reset relay 286 is in an operated condition so that a plurality of normally open contacts 286*a* and 286*b* are closed. The closed contacts 286*a* extend the positive voltage provided by the full wave rectifier 284 to the holding circuits for the register relay groups 250 and 260—263. The closed contacts 286*b* prepare a holding circuit for the card stop solenoid 156 and a relay 288. When the time recorder is originally placed in operation, the switch 268 is closed to render the timing drive motor 270 effective to periodically close the cam controlled contacts 274*a*, 276*a*, 278*a* and 280*a*. Further, incident to thus placing the timing circuit 24 is operation, the timing circuit 24 is adjusted to a correct setting of instant date and time, as described in detail in the above identified copending Parsons et al. application. The time recorder unit 20 is then conditioned for operation by placing a stack of blank cards 22 in the cavity 50 of the magazine 34 so that the operating element 57 of the switch 56 is engaged to operate this switch to close a pair of contacts 56*a*. The closure of the contacts 56*a* connects a lamp 308 across the terminals 271 and 272 so that the lamp 308 is illuminated to provide a visible indication that a supply of cards 22 has been placed in the magazine 34.

To feed a first blank card 22 into the guideway 38, a switch 298 is manually closed so that the positive potential supplied by the full wave rectifier 284 is forwarded to the operating winding 296 of a single stroke gong, thereby providing an audible indication that a card has been fed into the time recorder unit 20. Concurrently with energizing the audible annunciator 290, the solenoid 90 is momentarily energized to retract the armature 92 so that the latch arm 82 is moved out of engagement with the shoulder 80*a* on the detent element 80. Thereafter, the detent element 80 moves through a single cycle of rotation during which the bell crank 66 reciprocates the knife supporting block 58 so that the lowermost card 22 in the magazine 34 is fed into the guideway 38.

When the leading edge of the card 22 supplied from the magazine 34 is advanced into the guideway 38, the operator arm 136 is engaged and deflected so that the switch 132 is operated to open a pair of contacts 132*a* and to close a pair of contacts 132*b*. The closure of the contacts 132*b* prepares an operating circuit for the solenoid 108 in the second card feeding assembly 40. When, during the forward movement of the knife supporting block 58, the leading edge of the card 22 being fed passes beyond the drive wheel 97 and into engagement with the resilient operator arm 146, the switch 142 is operated to close a pair of contacts 142*a*. The closure of the contacts 142*a* completes an energizing circuit for the solenoid 108 extending from the positive potential source through the plurality of closed contacts 132*b*, 302*b* and 142*a*. In operating, the solenoid 108 retracts its armature 110 so that the idler roller 126 is biased into engagement with the card 22 supplied by the first card feeding assembly 36, thereby to bias this card into driving engagement with the wheel 96.

The operation of the solenoid 108 also closes the contacts 108*a* so that the positive potential supplied through the contacts 132*b* and 302*b* is forwarded through the closed contacts 108*a* and a plurality of normally closed contacts 300*a* and 306*e* to operate a relay 300. The operation of the relay 300 opens the contacts 300*a* and closes a plurality of contacts 300*b*—300*f*. The opening of the contacts 300*a* interrupts the above described operating circuit for the relay 300, but this relay does not release inasmuch as the concurrent closure of the contacts 300*b* completes a holding circuit for this relay extending to the positive potential source.

The closure of the contacts 300*c* prepares a portion of an operating circuit for a relay 302, and the closure of the contacts 300*e* prepares a portion of an operating circuit for the clutch solenoid 182. The closure of the contacts 300*b* prepares a portion of an operating circuit for the solenoid 168 in the card indexing drive assembly 46, and the closure of the contacts 300*f* completes an energizing circuit for the common drive motor 106 so that the motor shaft 104 thereof is placed in rotation, thereby initiating rotation of the wheel 96. This rotation of the wheel 96, by virtue of the prior operation of the solenoid 108, is effective to quickly advance the card 22 through the guideway 38 and, into the opening 152 so that the leading edge of this card engages the gate element 150 in the stop or card locating assembly 44. As the leading edge of the card 22 moves into engagement with the gate element 150, the trailing edge thereof moves out of engagement with the operator element 136 for the switch 132, thereby releasing this switch to open the contacts 132*b* and to close the contacts 132*a*.

The opening of the contacts 132*b* interrupts the above described operating circuit for the solenoid 108 so that this solenoid releases to open the contacts 108*a* and to move the idler roller 126 out of engagement with the drive wheel 96. The closure of the contacts 132*a* completes an operating circuit for the solenoid 168 which extends from the positive potential source through the closed contacts 132*a*, 300*d* and 306*b*. The energization of the solenoid 168 retracts its armature 170 so that the idler roller 162 is biased into engagement with the card 22 in the punching position, thereby resiliently biasing this card against the indexing drive wheel 160. The control circuit 32 and the time recorder unit 20 remain in this condition until an employee identifying key is inserted into the sensing device.

A recording cycle of operation of the control circuit 32 and of the time recorder unit 20 is initiated when an employee, upon entering or leaving the factory, inserts a coded key through the opening 26 into the sensing device. The insertion of a key into the sensing device, as disclosed in detail in the above identified Parsons et al. application, closes a pair of contacts 292, to concurrently complete an energizing circuit for the solenoid 156 in the gate assembly 44, for the slow-to-operate relay, and for a slow-to-release relay 290 through a pair of normally closed contacts 288*c*. The energization of the solenoid 156 elevates the gate element 150 out of its card intercepting position so that the card 22 in the punching position can now be advanced step-by-step under the control of the card indexing drive assembly 46. In moving upwardly, the gate element 150 closes the contacts 158 to complete an additional holding circuit for the relay 300.

The operation of the relay 290 closes a pair of contacts 290*a* which completes an obvious operating circuit for a coding solenoid 294 in the sensing device. The operation of this solenoid, as described in detail in the copending Parsons et al. application, renders the sensing device effective to sense the perforations in the inserted key, thereby resulting in the selective operation of the register relay groups 250, 260, 261, 262 and 263. The selective operation of the relays in these groups, in closing contacts similar to the contacts 258*a*, completes holding circuits for the operated relays extending to the positive potential source through the closed contacts 286*a*. Thus, the groups of register relays are selectively operated in response to the insertion of a key into the sensing device so as to store coded representations of the five digits forming the designation or identification of the employee. Further, the selective operation of these relays decodes the binary representations into five marking paths representing the five decimal digits in the badge number.

After the slow-to-operate period of the relay 288, this relay operates to close a plurality of contacts 288*a* and 288*b* and to open the contacts 288*c*. The closure of the contacts 288*a* completes a holding circuit for the solenoid 156 and the relay 288 extending to the positive potential source through the closed contacts 286*b*. This circuit maintains the relay 288 and the solenoid 156 operated when the inserted key is subsequently withdrawn from the sensing unit to open the contacts 292. The opening of the contacts 288*c* interrupts the above described operating circuit for the relay 290 so that after the slow-to-release interval thereof, this relay releases to open the contacts 290*a*, thereby releasing the coding solenoid 294. The release of the coding solenoid 294 permits the withdrawal of the key inserted into the sensing device so that the contacts 292 are opened. The opening of the contacts 292, however, does not release either the solenoid 156 or the relay 288 inasmuch as a holding circuit has been completed therefor through the closed contacts 288*a*.

Referring back to the operation of the relay 288, the closure of the contacts 288*b* forwards the positive potential through the closed contacts 132*a* and 300*c* to the contacts 278*a* controlled by the cam 278. If the cam 278 is in a position indicating that an adjustment of the timing circuit 294 has been completed, the contacts 278*a* are closed so that the positive potential supplied by the above described circuit is further forwarded through a pair of normally closed contacts 304*b* to complete an obvious operating circuit for a relay 302. The operation of the relay 302 opens the contacts 302*b* and closes a plurality of contacts 302*a* and 302*c*.

The opening of the contacts 302*b* interrupts, at an additional point, the previously interrupted operating circuit for the solenoid 108 in the second card feeding assembly 40, thereby to prevent an additional card 22 from being fed to the punching assembly 42 during the interval in which this assembly is effective to record the date and time information in conjunction with the employee designation now stored in the register relay groups 250 and 260—263. The closure of the contacts 302*a* connects a shunt around the closed contacts 132*a* to prevent the release of the relay 302 in the event that the switch 132 is inadvertently operated during the recording cycle of operation. The closure of the contacts 302*c* completes an operating circuit for the clutch solenoid 182 which extends from the source of positive potential through a pair of normally closed contacts 306*c* and the closed contacts 300*e* and 302*c*.

The energization of the solenoid 182 places the main control shaft 184 in rotation to initiate a cycle of operation in which the punching assembly 42 is operated to perforate the first digit in the card 22, in which the card 22 is advanced a single step following the perforation of the first item therein, and in which the commutator 202 is advanced a single step following the recording of the first item of information. Referring back to the above described closure of the contacts 288*b*, the closure of these contacts also forwards positive potential through the closed contacts 300*c* to the contacts 200*a* controlled by the cam 200 on the main control shaft 184. After the shaft 184 rotates through a few degrees, the contacts 200*a* are closed to forward a holding potential through a blocking diode 183 to the clutch solenoid 182 and also to forward the positive potential through the common ring 212, the connected wipers 208 and 210, and the first conductive segment 206 to the translating or decoding path prepared by the selective operation of the first register relay group 250. In the illustrative example set forth above in which only the relay 258 is operated, a decoding path is prepared which forwards the positive potential through the contacts 251*b*, 252*c*, 254*d* and 258*c* to operate the interposer solenoid 190 representing the numerical digit "8." Accordingly, this solenoid 190 is operated at this time to move the enlarged portion 188*a* of its armature 180 (FIG. 2A) into alignment with the shouldered portion 186*a* on the related punch element 186.

During continuing rotation of the main control shaft 184, the punch supporting frame 189 is lowered and the blocked punch element 186 representing the numerical digit "8" perforates the first column of the card 22 in the eighth row thereof to represent the digit "8." During this continuing rotation of the main control shaft 184, the cam 200 again opens the contacts 200*a*, the punch supporting frame 189 is elevated, and the commutator 202 is operated so that the wipers 208 and 210 connect the contacts 200*a* with the segment 206 which is connected to the translating network controlled by the second group 260 of register relays.

The continuing rotation of the main control shaft 184 operates the assembly 42 and the commutator 202 so that the remaining four digits of the employee designation, as stored in the register relay groups 260—263, are recorded on the card 22. Thereafter, the commutator 202 advances to render the time and date registers in the timing circuit 24 effective to control the perforation of the tens and units days digits, the tens and units hours digits, and the tenths and hundredths of an hour digits. When the commutator 202 is advanced to its next setting, the positive potential supplied to the closed contacts 200*a* is forwarded through the wiper 277 of the switch 275 to operate the interposer solenoid 190 representing the digit "2," thereby providing an indication of the gate or department in which the time recorder unit 20 is located.

Following the completion of the recording of the digital designation of the gate or department location, the succeeding cycles of revolution of the main control shaft 184 advance the wipers 208 and 210 over the remaining segments 206 of the commutator 202 until such time as the wiper 208 is moved into engagement with the last segment 206. In this position, an operating circuit for a last column relay 306 is prepared. The rotation of the control shaft 184 during this last cycle of revolution next advances the cam 200 so that the contacts 200*a* are closed to complete the operating circuit for the relay 306. In operating, this relay closes a plurality of contacts 306*a* and 306*d* and opens the contacts 306*b*, 306*c* and 306*e*.

The opening of the contacts 306*b* interrupts the operating circuit for the solenoid 168 in the indexing drive assembly 46 so that the idler roller 162 is moved out of engagement with the card 22, thereby to permit this card to be discharged under the control of the ejecting drive assembly 48. The closure of the contacts 306*a* completes an obvious operating circuit for the solenoid 240 in the ejecting drive assembly 48 so that the idler roller 222 resiliently biases the card 22 against the continuously rotating drive wheel 218. By thus biasing the punched card 22 against the wheel 218, this card is quickly ejected from the recorder unit 20 into a suitable receptacle therefor. The opening of the contacts 306*c* interrupts the operating circuit for the relay 286 and the clutch 182 so that these components release. The release of the clutch solenoid 182 conditions the detent mechanism for engaging the one revolution clutch forming a portion of the drive assembly for the main control shaft 184 so that, when the present cycle of revolution of this shaft is completed, further rotation thereof is positively prevented. The release of the relay 286 opens the contacts 286*a* and 286*b*. The opening of the contacts 286*a* releases the operated relays in the relay groups 250, 260—263 to restore the register relay circuit 30 to a normal condition in which it is capable of receiving the designation of the employee.

The opening of the contacts 286*b* interrupts the holding circuit for the solenoid 156 and the relay 288 so that these components are restored to their normal condition. In being restored, the solenoid 156 releases the gate element 150 so that, as the punched card 22 is ejected from the recorder unit 20, this gate moves to its card intercepting position to open the contacts 158 controlled thereby. The opening of the contacts 158, together with the opening of the contacts 306*e*, interrupts the holding circuits for the relay 300 so that this relay releases to aid in restoring the control circuit 32 to a normal condition. The opening of the contacts 300*c*, in response to the release of the relay 300, and the opening of the contacts 288*b*, in response to the release of the relay 288, interrupt the above described operating circuit for the relay 302 so that this relay releases to restore the contacts controlled thereby to their normal conditions. The release of the relay 302 therefore merely aids in restoring the control circuit 32 to a normal condition.

Referring back to the above described operation of the last column relay 306, the closure of the contacts 306*d* completes an obvious operating circuit for the audible indicator 296 and for the solenoid 90. The energization of the solenoid 90 retracts its armature 92 so that the latching arm 82 is moved out of engagement with the shoulder 80*a* on the detent member 80, thus permitting the bell crank 66 to reciprocate the knife supporting block 58 so that the lowermost card 22 in the cavity 50 of the magazine 34 is fed into the guideway 38. Feeding a card 22 into the guideway 38 causes sequential operation of the switches 132 and 142 to actuate the second card feeding assembly 40 so that the leading edge of the inserted card 22 is moved into engagement with the gate element 150. Thus, in response to the completion of a recording cycle of operation of the time recorder unit 20, a blank card 22 is advanced to a perforating position in the punching assembly 42. As the card 22 moves into this punching position, the switch 132 is released, as described above, to render the second card feeding assembly 40 ineffective.

During the last cycle of rotation of the main control shaft 184 and prior to the time at which this cycle of revolution is completed, the cam 200 again opens the contacts 200*a* to release the relay 306 so that the contacts 306*a* and 306*d* are opened and the contacts 306*b*, 306*c* and 306*e* are opened. The opening of the contacts 306*d* and 306*a* release the solenoid 240 in the ejecting drive assembly 48 and the solenoid 90 in the first card feeding assembly 36. The remainder of the contact operations produced by the release of the relay 306 merely aid in restoring the control circuit 32 to a normal condition. Further, during this last cycle of rotation of the control shaft 184, the wipers 208 and 210 are restored to their normal positions, as illustrated in FIG. 4 of the drawings, to condition this commutator for an additional cycle of operation during which the items of information pertaining to the next employee are recorded on the blank record card 22 now positioned in the guideway 38.

The control circuit 32, in addition to performing the functions described above, also includes a time delay relay 304 which is selectively operated under the control of the cam 276, the cam controlled contacts 276*a*, and the commutator 202 to prevent the continuance of a cycle of recording operation of the time recorder unit 20 in the event that the date and time information has not been recorded on the card 22 at the time at which the cams 274 and 280 approach the position in which the setting of the timing circuit 24 is to be adjusted to the next highest setting. This interlock circuit arrests further recording operation of the time recorder unit 20 until such time as the timing circuit 24 has been adjusted to its next successive setting, and the interrupted cycle of recording operation is then completed. The time delay relay 304 operates to perform this function as described in detail in the above identified copending Parsons et al. application.

When the supply of cards 22 in the magazine 34 becomes depleted, the switch 56 is released to terminate the illumination of the lamp 308, thereby providing a visible indication that the card supply has been exhausted. In addition, since each cycle of operation of the control circuit 32 is initiated by and is dependent on the closure of the contacts 132*b* and 142*a* in response to the operation of the switches 132 and 142 by the insertion of a card 22 into the guideway 38, when the supply of cards 22 in the magazine 34 becomes exhausted, additional cycles of operation of the control circuit 32 cannot be initiated by the insertion of a key into the sensing unit. Thus, the failure of the lamp 308 to be illuminated and the failure of a card 22 to be ejected in response to the insertion of a key into the sensing unit provides an indication that the recorder unit 20 should not be used until the card supply is restored. As described above, the time recorder unit 20 is conditioned for reoperation by the momentary operation of the switch 298.

In summary, the time recorder unit 20 of the present invention includes automatic key controlled time recording means for supplying a card from a magazine into a recorder and for thereafter initiating operation of the recorder by the insertion of a coded key into a sensing device. The key insertion not only places the recorder unit 20 in operation, but also causes the selective storage in the recorder unit of the designation of the employee represented by the indicia carried on the key. The operation of the time recorder unit is fully integrated with the operation of means for supplying a blank card from the magazine to a proper punching position and with the operation of ejecting means so that a primary record capable of direct use in tabulating equipment is provided including both date and time information, the department or location in which the time recorder is located, and the designation of the employee without requiring any manual operations except the insertion of the coded key into the sensing unit.

Although the present invention has been described in conjunction with a single embodiment thereof, it is obvious that numerous other embodiments may be devised by those skilled in the art which will fall within the spirit and scope of the principles of this invention.

What is claimed and desired to be secured by Letters Patent of the United States is:

1. A time recording unit for use with keys having indicia thereon representing employee designations comprising a continuously operative timing circuit for storing instant date and time, register means, sensing means for removably receiving an inserted key and responsive to the indicia on an inserted key for operating said register means to store the sensed employee designation, recorder means for recording data on a card, switching means for sequentially rendering said recorder responsive to control by said timing circuit and said register means so that instant date and time and said stored employee designation are recorded on a card, means responsive to the insertion of a key into said sensing means for initiating operation of said switching means, a card magazine adapted to store a plurality of cards and including card feeding means, and means controlled by said switching means for operating said card feeding means to advance a card from said magazine into said recorder.

2. A time recording unit for use with keys having indicia thereon representing employee designations comprising a continuously operative timing circuit for storing instant date and time, register means, sensing means for removably receiving an inserted key and responsive to the indicia on an inserted key for operating said register means to store the sensed employee designation, recorder means for recording data on a card and including a card receiving guideway, a commutator for sequentially rendering said recorder responsive to control by said timing circuit and said register means so that instant date and time and said stored employee designation are recorded on a card, means responsive to the insertion of a key into said sensing means for initiating operation of said commutator, a card magazine adapted to store a plurality of cards and including card feeding means, means controlled by said commutator for operating said card feeding means to advance a card from said magazine into said guideway, and means controlled by the movement of a card into said guideway from said magazine for then advancing said card through said guideway to said recorder.

3. A tie recording unit for use with keys having indicia thereon representing employee designations comprising a continuously operative timing circuit for storing instant date and time, register means, sensing means for removably receiving an inserted key and responsive to the indicia on an inserted key for operating said register means to store the sensed employee designation, recorder means for recording data on a card at a recording position, a guideway connected to said recorder through which a card is advanced to said recording position, a commutator for sequentially rendering said recorder responsive to control by said timing circuit and said register means so that instant date and time and said stored employee designation are recorded on a card, means responsive to the insertion of a key into said sensing means for initiating operation of said commutator, a card magazine adapted to store a plurality of cards, first card feeding means, first control means controlled by said commutator for operating said first card feeding means to advance a card from said magazine into said guideway, second card feeding means, and second control means controlled by movement of a card into said guideway for operating said second card feeding means to advance said card in said guideway through said guideway to said recording position in said recorder.

4. The time recording unit set forth in claim 3 including means controlled by movement of said card to said recording position for arresting operation of said second card feeding means.

5. In a time recorder unit controlled by keys having indicia thereon representing employee designations, a card punching apparatus including a shiftable card locating element for controlling the movement of a card to said punching apparatus, means for feeding a card into said apparatus and into engagement with said element, drive means for advancing said card relative to said punching apparatus in synchronism with the operation thereof, timing means for supplying timing signals representing instant time, sensing means for removably receiving an inserted key and for sensing the indicia on said inserted key, means controlled by said sensed indicia and by said timing signals for selectvely operating said punching apparatus to record instant time and the employee designation on said card, and means controlled by the insertion of a key into said sensing means for shifting said card locating element out of engagement with said card and for initiating operation of said drive means.

6. The time recorder unit set forth in claim 5 including means operated in response to the completion of the recording of the instant time and the employee designation on the card for restoring said card locating element to a card engaging position and for operating said card feeding means to feed another card into engagement with said element.

7. A time recording unit for use with keys having indicia thereon representing employee designations comprising a continuously operative timing circuit for storing time, register means, sensing means for removably receiving an inserted key and responsive to the indicia on an inserted key for operating said register means to store the sensed employee designation, recorder means including a common group of punch elements for recording data on a card, switching means for individually connecting said common group of punch elements to said timing circuit and to said register means in a fixed sequence so that instant time and said stored employee designation are recorded on a card, means responsive to the insertion of a key into said sensing means for initiating operation of said switching means, a card magazine adapted to store a plurality of cards and including card feeding means, and means connected to said switching means for operating said card feeding means to advance a card from said magazine into said recorder in response to the completion of the recording of the time and employee designation information on a preceding card.

8. A recorder unit for use with keys having indicia thereon representing employee designations comprising timing means continuously operative to successive settings representing instant time, register means, sensing means for removably receiving an inserted key and for sensing the indicia on an inserted key to operate said register means to store an employee designation, a recorder controlled by said timing means and said register means to record instant time and the stored employee designation on a card, drive means for advancing a card through said recorder, means controlled by each insertion of a key into said sensing means for operating said recorder to record instant time and an employee designation on a card and for operating said drive means to advance a card through said recorder during the recording of said instant time and employee designation, a card magazine adapted to store a plurality of cards, feed means for feeding a card from said magazine into said recorder, and means included in said recorder for operating said feed means to feed a card into said recorder in response to the completion of the recording of the instant time and employee designation on the preceding card.

9. A time recording unit for use with keys having indicia thereon representing employee designations comprising a continuously operative timing circuit for storing instant date and time, register means, sensing means for removably receiving an inserted key and responsive to the indicia on the inserted key for operating said register means to store the sensed employee designation, recorder means for recording data on a card and having a card receiving opening, first switching means for sequentially rendering said recorder responsive to control by said timing circuits and said register means so that instant date and time and said stored employee designation are recorded on a card, means responsive to the insertion of a key into said sensing means for initiating operation of said switching means, a card guideway in alignment with said opening, a card magazine adapted to store a plurality of cards and including card feeding means for feeding cards into said guideway, a card drive wheel extending into said guideway, an idler roller extending into said guideway in alignment with and spaced from said drive wheel, means for shifting said idler roller toward said drive wheel, second switching means in said guideway operated in response to the insertion of a card from said card magazine, third switching means operated by the movement of said card toward said opening and beyond said drive wheel, control means controlled by said second and third switching means for operating said shifting means so that said idler roller is shifted toward said drive wheel to bias said card against said drive wheel, thereby to render said drive wheel effective to advance said card to said guideway and into said opening, and means controlled by said first switching means for operating said card feeding means to advance a card from said magazine into said guideway whereby said card may be advanced through said guideway by said drive wheel under the control of said second and third switching means.

References Cited in the file of this patent

UNITED STATES PATENTS

| | | |
|---|---|---|
| 385,900 | Amet | July 10, 1888 |
| 633,126 | Deubner | Sept. 19, 1899 |
| 1,348,791 | Evans | Aug. 3, 1920 |
| 1,800,019 | Hewett | Apr. 7, 1931 |
| 2,172,329 | Bryce | Sept. 5, 1939 |
| 2,196,194 | Cooper | Apr. 9, 1940 |
| 2,338,180 | Harrison | Jan. 4, 1944 |
| 2,793,035 | Wroblewski | May 21, 1957 |
| 2,926,014 | Goodhue et al. | Feb. 23, 1960 |